United States Patent
Nammi et al.

(10) Patent No.: US 11,671,226 B2
(45) Date of Patent: Jun. 6, 2023

(54) SWITCHING BETWEEN NON-ORTHOGONAL MULTIPLE ACCESS AND ORTHOGONAL MULTIPLE ACCESS SYSTEMS FOR UPLINK DATA TRANSMISSION

(71) Applicant: AT&T Intellectual Property I, L.P., Atlanta, GA (US)

(72) Inventors: Sairamesh Nammi, Austin, TX (US); Saeed Ghassemzadeh, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 74 days.

(21) Appl. No.: 17/347,901

(22) Filed: Jun. 15, 2021

(65) Prior Publication Data
US 2021/0314120 A1 Oct. 7, 2021

Related U.S. Application Data

(63) Continuation of application No. 16/574,484, filed on Sep. 18, 2019, now Pat. No. 11,063,729, which is a
(Continued)

(51) Int. Cl.
*H04L 5/00* (2006.01)
*H04W 76/27* (2018.01)
*H04W 72/23* (2023.01)

(52) U.S. Cl.
CPC .......... *H04L 5/0053* (2013.01); *H04L 5/0023* (2013.01); *H04L 5/0046* (2013.01); *H04W 72/23* (2023.01); *H04W 76/27* (2018.02)

(58) Field of Classification Search
CPC ............... H04L 5/0005; H04L 5/0023; H04L 5/0046; H04L 5/0053; H04L 5/0092; H04W 72/14; H04W 76/00–27
See application file for complete search history.

(56) References Cited

U.S. PATENT DOCUMENTS 9,712,272 B2 * 7/2017 Zhu ................. H04L 5/0053
2005/0237919 A1 10/2005 Pettendorf et al.
(Continued)

FOREIGN PATENT DOCUMENTS

WO 2017/139005 A1 8/2017
WO 2017/204470 A1 11/2017

OTHER PUBLICATIONS

Notice of Allowance received for U.S. Appl. No. 15/977,836 dated Jun. 19, 2019, 42 pages.
(Continued)

*Primary Examiner* — Michael Thier
*Assistant Examiner* — Prince A Mensah
(74) *Attorney, Agent, or Firm* — nin, Turocy & Watson, LLP

(57) ABSTRACT

Various embodiments disclosed herein provide for switching between non-orthogonal and orthogonal multiple access protocols dynamically. A base station device can determine whether a user equipment device on a communication link should use a non-orthogonal multiple access system or an orthogonal multiple access system based on one or more attributes of the communication link, and send an indication of the selection to the user equipment device. The base station device can indicate the selection using a spreading factor parameter that is either equal to one or greater than one. If the spreading factor parameter is equal to one, that can indicate to the user equipment device to use an orthogonal multiple access system, whereas if the spreading factor parameter is greater than one, that can indicate to the user
(Continued)

equipment device to use a non-orthogonal multiple access system.

20 Claims, 10 Drawing Sheets

Related U.S. Application Data continuation of application No. 15/977,836, filed on May 11, 2018, now Pat. No. 10,461,910.

(56) References Cited

U.S. PATENT DOCUMENTS

| | | | |
|---|---|---|---|
| 2007/0091837 A1* | 4/2007 | Li | H04W 72/14 370/328 |
| 2014/0314006 A1 | 10/2014 | Suh et al. | |
| 2015/0312074 A1 | 10/2015 | Zhu et al. | |
| 2016/0219529 A1 | 7/2016 | Benjebbour et al. | |
| 2017/0033832 A1 | 2/2017 | Dang et al. | |
| 2018/0160372 A1 | 1/2018 | Benjebbour et al. | |
| 2018/0054270 A1 | 2/2018 | Xiong et al. | |
| 2018/0069644 A1 | 3/2018 | Zhu et al. | |
| 2018/0070274 A1 | 3/2018 | Ode | |
| 2018/0124684 A1 | 5/2018 | Kwon et al. | |
| 2019/0029031 A1 | 1/2019 | Kumar et al. | |
| 2019/0174472 A1 | 6/2019 | Lee et al. | |
| 2021/0045181 A1* | 2/2021 | Li | H04L 5/0005 |
| 2021/0083828 A1* | 3/2021 | Matsuda | H04L 5/0092 |

OTHER PUBLICATIONS

Non Final office action received for U.S. Appl. No. 16/574,484 dated Aug. 27, 2020, 58 pages.
Notice of Allowance received for U.S. Appl. No. 16/574,484 dated Mar. 10, 2021, 30 pages.
U.S. Appl. No. 15/977,836, filed May 11, 2018.
U.S. Appl. No. 16/574,484, filed Sep. 18, 2019.

* cited by examiner

SWITCHING BETWEEN NON-ORTHOGONAL MULTIPLE ACCESS AND ORTHOGONAL MULTIPLE ACCESS SYSTEMS FOR UPLINK DATA TRANSMISSION

This application is a continuation of, and claims priority to each of, U.S. patent application Ser. No. 16/574,484 (now U.S. Pat. No. 11,063,729), filed Sep. 18, 2019, and entitled "SWITCHING BETWEEN NON-ORTHOGONAL MULTIPLE ACCESS AND ORTHOGONAL MULTIPLE ACCESS SYSTEMS FOR UPLINK DATA TRANSMISSION," which is a continuation of U.S. patent application Ser. No. 15/977,836 (now U.S. Pat. No. 10,461,910), filed May 11, 2018, and entitled "SWITCHING BETWEEN NON-ORTHOGONAL MULTIPLE ACCESS AND ORTHOGONAL MULTIPLE ACCESS SYSTEMS FOR UPLINK DATA TRANSMISSION," the entireties of which applications are expressly incorporated herein by reference.

TECHNICAL FIELD

The present application relates generally to the field of mobile communications and more specifically to switching between non-orthogonal multi-user access systems and orthogonal multiple access modes in a next generation wireless network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
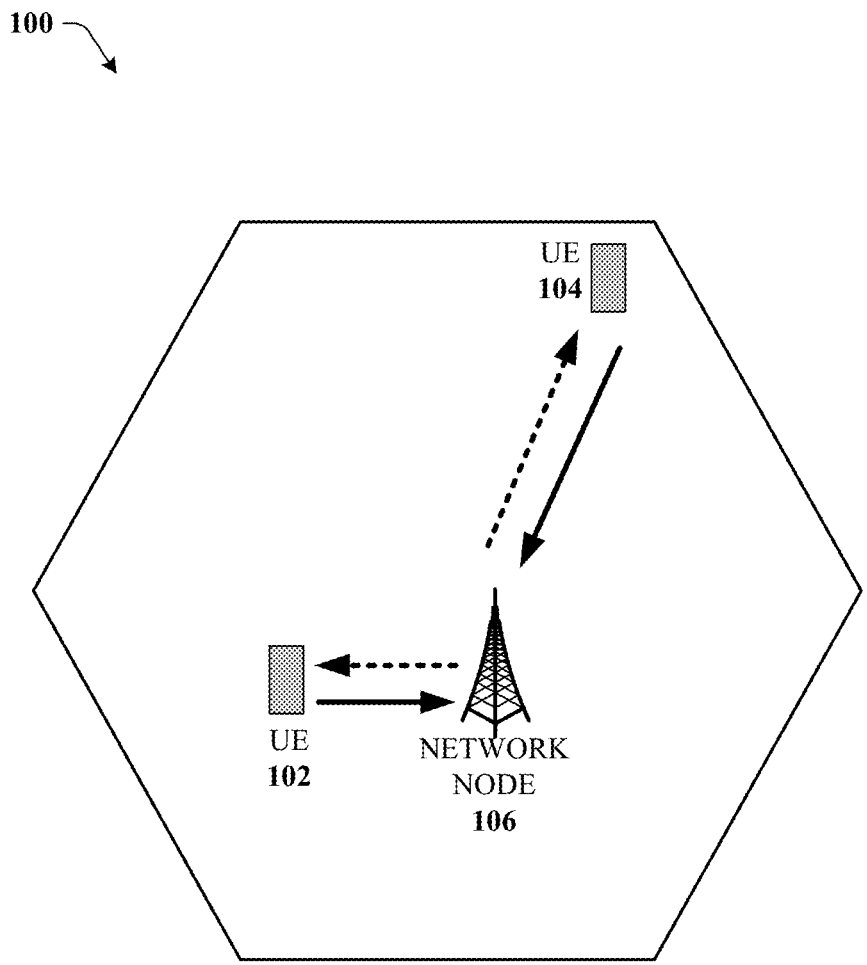
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for switching between non-orthogonal and orthogonal multiple access protocols dynamically. A base station device can determine whether a user equipment device on a communication link should use a non-orthogonal multiple access system or an orthogonal multiple access system based on one or more attributes of the communication link, and send an indication of the selection to the user equipment device. The base station device can indicate the selection using a spreading factor parameter that is either equal to one or greater than one. If the spreading factor parameter is equal to one, that can indicate to the user equipment device to use an orthogonal multiple access system, whereas if the spreading factor parameter is greater than one, that can indicate to the user equipment device to use a non-orthogonal multiple access system.

In various embodiments, a base station device can comprise a processor and a memory that stores executable instructions that, when executed by the processor facilitate performance of operations. The operations can comprise determining a channel quality parameter for a communication link between the base station device and a user equipment device. The operations can also comprise in response to the channel quality parameter satisfying a defined criterion, determining that the user equipment device is to use a non-orthogonal multiple access mode for an uplink transmission. The operations can also comprise in response to the channel quality parameter not satisfying the defined criterion, determining that the user equipment device will use an orthogonal multiple access mode for the uplink transmission. The operations can also comprise facilitating, to the user equipment, transmitting an indication of a selection of a multiple access mode for the uplink transmission via a spreading factor parameter, wherein the spreading factor parameter being greater than a value indicates the non-orthogonal multiple access mode and the spreading factor parameter being less than the value indicates the orthogonal multiple access mode.

In another embodiment, method comprises determining, by a base station device comprising a processor, a parameter relating to a channel quality of an uplink channel associated with a user equipment device. The method can also comprise in response to the parameter not satisfying a defined criterion, determining, by the base station device, that the user equipment device is to incorporate a non-orthogonal multiple access mode for an uplink transmission via the uplink channel. The method can also comprise in response to the parameter satisfying the defined criterion, determining, by the base station device, that the user equipment device is to incorporate an orthogonal multiple access mode for an uplink transmission via the uplink channel. The operations can also comprise facilitating, by the base station device, transmitting an indication of a selection of a multiple access mode for the uplink transmission via a spreading factor parameter, wherein the spreading factor parameter being greater than one indicates the non-orthogonal multiple access mode and the spreading factor parameter being less than one indicates the orthogonal multiple access mode.

In another embodiment, a user equipment device can comprise a processor and a memory that stores executable instructions that, when executed by the processor, facilitate performance of operations. The operations can include receiving a first transmission from a base station device. The operations can also include determining that the first transmission comprises an indication for a type of multiple access mode to use for an uplink transmission, wherein the indication comprises a spreading factor parameter. The operations can also include transmitting the uplink transmission via a non-orthogonal multiple access mode in response to the spreading factor parameter being greater than one. The operations can also include transmitting the uplink transmission via an orthogonal multiple access mode in response to the spreading factor parameter being equal to one.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In an embodiment, the network node 106 can dynamically switch between using non-orthogonal multiple access protocols and orthogonal multiple access protocols when communicating with UE 104 and 102. The network node or base station 106 can communicate to the UEs 104 and 102 the selection of which type of multiple access system to use for the uplink communications, and the UEs 102 and 104 can then use the indication to determine which mode to use on an uplink transmission. Multiple access is a system whereby mobile users can share the allotted spectrum in the most effective manner In an orthogonal multiple access (OMA) system, the base station can allocate UEs on different time-frequency domain resources. Multiple access can be achieved by assigning subsets of subcarriers to individual users or devices. This can allow simultaneous low-data rate transmission from several users.

In a non-orthogonal multiple access system, the system uses the power domain to separate signals from each other. The signals from different mobile devices can possess significant differences in power levels. It is then possible to isolate the high level signal at the receiver and then cancel it out to leave only the low level signal. In this way, non-orthogonal multiple access (NOMA) exploits the path loss differences amongst users. At the network, the network can use an advanced receiver, such as serial interference, cancellation, etc., to remove interference and are able to decode the desired signals. In this way, the current NR system capacity can be improved. In an embodiment, non orthogonal multiple access (NOMA) scheme can use the code domain for multiple access, where different users are served with different codes. The users with better channel conditions employ interference cancellation to remove the messages intended for other users before decoding their own.

The benefit of using NOMA can be illustrated in FIG. 1. Consider that UE 104 is close to the edge of its cell, whose channel condition is very poor. For conventional NR, an orthogonal bandwidth channel, e.g., a time slot will be allocated to this user, and the other users cannot use this time slot. The key idea of NOMA is to squeeze another user with better channel condition, e.g., UE 102, into this time slot. Since UE 104's channel condition is very poor, the interference from UE 102 will not cause much performance degradation to UE 104, but the overall system throughput can be significantly improved since additional information can be delivered between the base station (BS) and UE 102.

In an embodiment, the network node can use code domain spreading where an additional block of spreading is used. The users are differentiated using by using different spreading codes. The spreading codes can be taken from Hadamard family of codes, codes which satisfy the Welch bound etc.

In general, the gains with NOMA are high when the load of the cell or the number of the UEs is very high as it is easy to pair UEs. However, when the load of the cell is very low it is hard to find the right pair of the UEs, which reduces the overall throughput there by making NOMA unattractive. Hence this disclosure provides an efficient mechanism for transitioning between NOMA and OMA transmission schemes to improve the performance of 5G systems for uplink data transmission.

Therefore, the network node 106 can obtain information about the channel between the UE 104 or 102 and the network, determine whether to use NOMA or OMA for a particular UE, and the communicate the recommendation to the UE about the spreading factor, where if a spreading factor is equal to 1, that can indicate OMA, while if the spreading factor is greater than one, that can indicate to the UE to use NOMA for the uplink transmission. The UE (e.g., UE 104) can receive the indication and determine whether the spreading factor parameter is above one or equal to one, and use the corresponding NOMA or OMA transmission scheme for the subsequent uplink transmission.

In an embodiment, the network node 106 can transmit the indication via radio resource control signaling, or via a downlink control channel transmission. If via downlink control channel transmission, the network node 106 can dynamically change the transmission scheme for the uplink transmission every transmit time interval (TTI) based on changing network conditions. In an embodiment, the user equipment can continue to use a prior transmission scheme, NOMA or OMA until the network node sends a new indication, or can default to one mode or the other in the absence of a particular indication for every TTI or group of TTIs.

Figure 2:
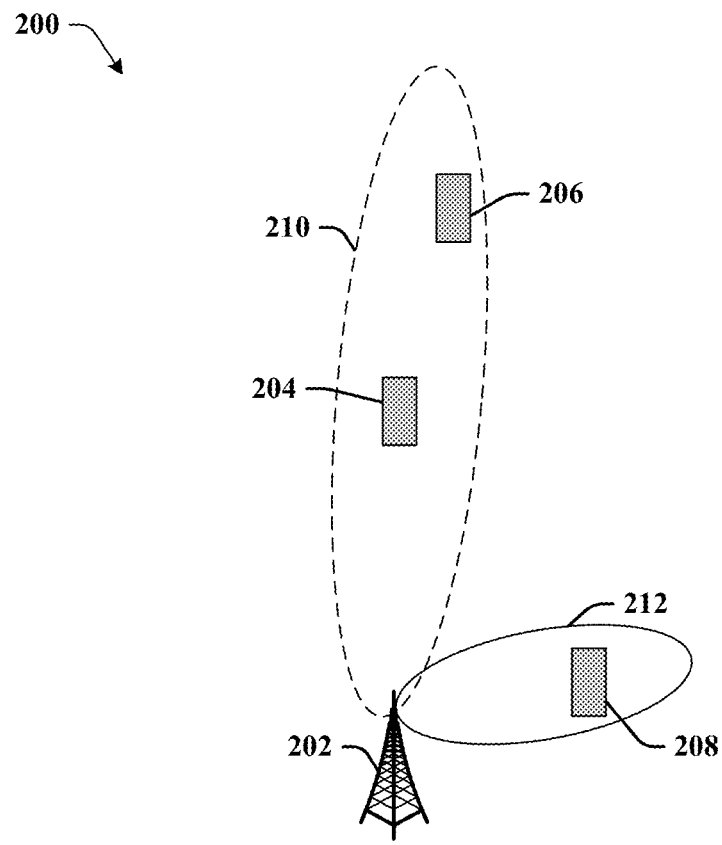
FIG. 2 illustrates an example block diagram showing a base station device communicating with both non-orthogonal and orthogonal multiple access systems in accordance with various aspects and embodiments of the subject disclosure.

Turning now to FIG. 2, illustrated is an example block diagram 200 showing a base station device 202 communicating in both non-orthogonal and orthogonal multiple access schemes in accordance with various aspects and embodiments of the subject disclosure.

In an embodiment, the base station device 202 can monitor the channel quality of communication links between the base station device 202 and UE 204, 206, and 208 based on analyzing channel state information (CSI) reports received from the UE 204, 206, and 208, or based on other metrics. In some embodiments, base station device 202 can estimate the channel quality based on distance of the UE 204, 206, and 208 from the base station device 202. Base station device 202 can also measure the channel quality based on path loss, known or estimated associated with each communication link with the mobile devices.

When the channel quality is high, or if a channel quality parameter (e.g., path loss, signal to interference plus noise ratio, distance) is above or below a predefined threshold indicating that the channel quality is high, then the base station device 202 can select an orthogonal multiple access scheme for the UE to use for an uplink transmission. For instance, in the case of UE 208, if the path loss is low, or lower than a predefined path loss parameter, or if the SINR is above a defined threshold, or if the distance is less than a threshold distance, then the base station device 202 can select an orthogonal multiple access scheme 212 for the UE 208 to transmit an uplink transmission back to the base station device 202.

In an embodiment, if in the case of UE 204 or 206, if the path loss is high, or higher than a predefined path loss parameter, or if the SINR is below a defined threshold, or if the distance is higher than a threshold distance, then the base station device 202 can select a non-orthogonal multiple access scheme 210 for the UE 204 or 206 to transmit an uplink transmission back to the base station device 202.

In an embodiment, the base station device 202 can configure the UEs 204, 206, and/or 208 to use the selected multiple access scheme during radio resource control signaling. In other embodiments, the base station device 202 can configure the UEs more dynamically by using a downlink control channel to send the spreading factor parameter indicator that can indicate to the UEs which multiple access scheme to use. Using the downlink control channel enables the base station device 202 to adjust, on a TTI basis or very rapidly, to changing network conditions, and so base station device 202 can rapidly and dynamically adjust from one TTI to another TTI, the type of multiple access scheme to use, non-orthogonal or orthogonal.

Figure 3:
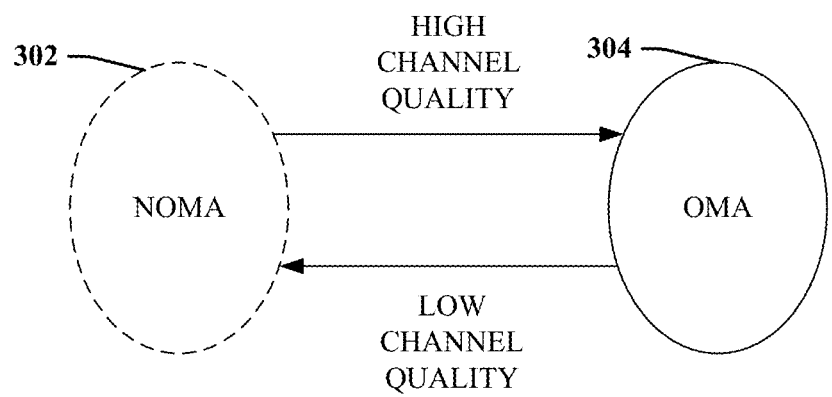
FIG. 3 illustrates an example block diagram showing differences between non-orthogonal and orthogonal multiple access systems in accordance with various aspects and embodiments of the subject disclosure.

Turning now to FIG. 3, illustrated is an example block diagram 300 showing differences between non-orthogonal 302 and orthogonal multiple 304 access systems in accordance with various aspects and embodiments of the subject disclosure. When the channel quality is high, the base station device (e.g., base station device 202) can determine that the UE should use an orthogonal multiple access scheme 304 to send an uplink transmission to the base station device. Alternatively, when the channel quality is low, the base station device can determine that the UE should use a non-orthogonal multiple access scheme 302 to send an uplink transmission to the base station device.

High or low quality can be determined by having a defined threshold, in whatever metric is being used to determine or estimate channel quality. For instance, if using path loss, a predefined path loss metric can be the inflection point between high and low quality. SINR and distance can also have distinct thresholds above or below which the base station device can determine the channel quality is high or low. In some embodiments, the threshold can change depending on other network conditions such as load, priority of communications, user account preferences, and other information.

Figure 4:
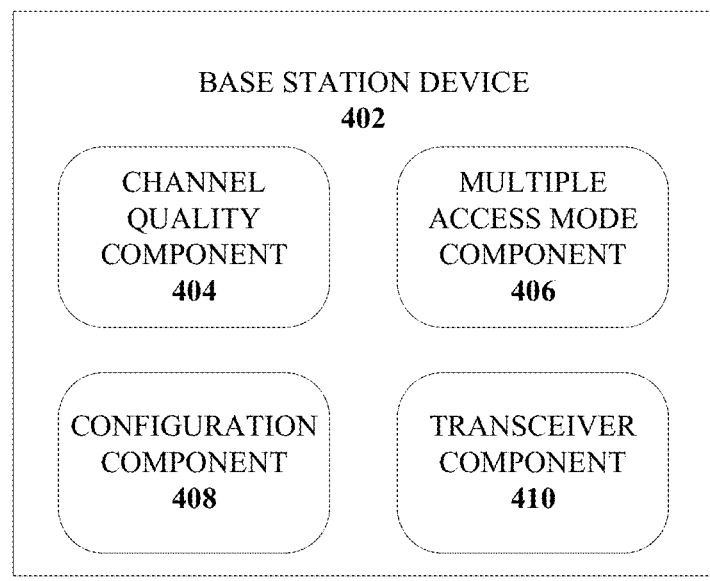
FIG. 4 illustrates an example block diagram of a base station device in accordance with various aspects and embodiments of the subject disclosure.

Turning now to FIG. 4, illustrated is block diagram 400 of an example base station device 402 in accordance with various aspects and embodiments of the subject disclosure.

A base station device 402 can include a channel quality component 404 that determines a quality of an uplink channel from a user equipment device. The channel quality component 404 can monitor the channel quality of communication links between the base station device and the UE based on analyzing channel state information (CSI) reports received from the UE, or based on other metrics. In some embodiments, the channel quality component 404 can estimate the channel quality based on distance of the UE from the base station device 402. Channel quality component 404 can also measure the channel quality based on path loss, known or estimated associated with each communication link with the mobile devices or based on reported or determined SINR.

The multiple access mode component 406 can be provided to select whether to use a non-orthogonal multiple access mode or an orthogonal multiple access mode based on the channel quality parameter determined by the channel quality component. If the channel quality is below a predetermined parameter, the multiple access mode can select a non-orthogonal multiple access mode for the UE to use when sending an uplink transmission. If the channel quality is above the predetermined parameter, the multiple access mode can select an orthogonal multiple access mode for the UE to use when sending the uplink transmission. In an embodiment, the multiple access mode component 406 can adjust the threshold depending on other network conditions such as load, priority of communications, user account preferences, and other information.

The configuration component 408 can be provided to configure an indication using a spreading factor parameter to indicate to the user equipment device whether to use NOMA or OMA for the uplink transmission. If the spreading factor is equal to 1, then the base station device 402 is indicating to the user equipment device to use OMA, whereas if the spreading factor parameters is greater than 1, then the base station device 402 is indicating to the user equipment device to use NOMA. A transceiver component 410 can then transmit the indication to the user equipment device, either during RRC signaling, or as part of a downlink control channel transmission.

Figure 5:
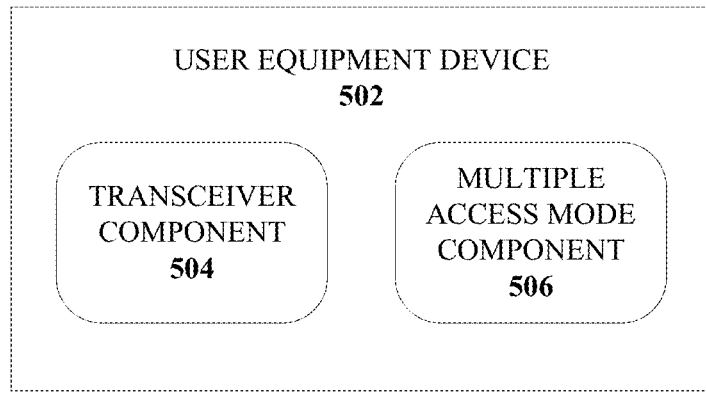
FIG. 5 illustrates an example block diagram of a user equipment device in accordance with various aspects and embodiments of the subject disclosure.

Turning now to FIG. 5, illustrated is block diagram 500 of an example user equipment device 502 in accordance with various aspects and embodiments of the subject disclosure.

The user equipment device 502 can include a transceiver component 504 that receives a transmission from a base station device. The transmission can be either part of a radio resource control message/configuration, or a downlink control channel transmission. The multiple access mode component 506 can analyze the message and determine, based on the spreading factor parameter, whether to send an uplink transmission to the base station device using NOMA or OMA. If the spreading factor parameter is equal to one, the transceiver component 504 will send the transmission via OMA, and if the spreading factor parameter is greater than one, the transceiver component 504 will send the transmission via NOMA.

Figure 6:
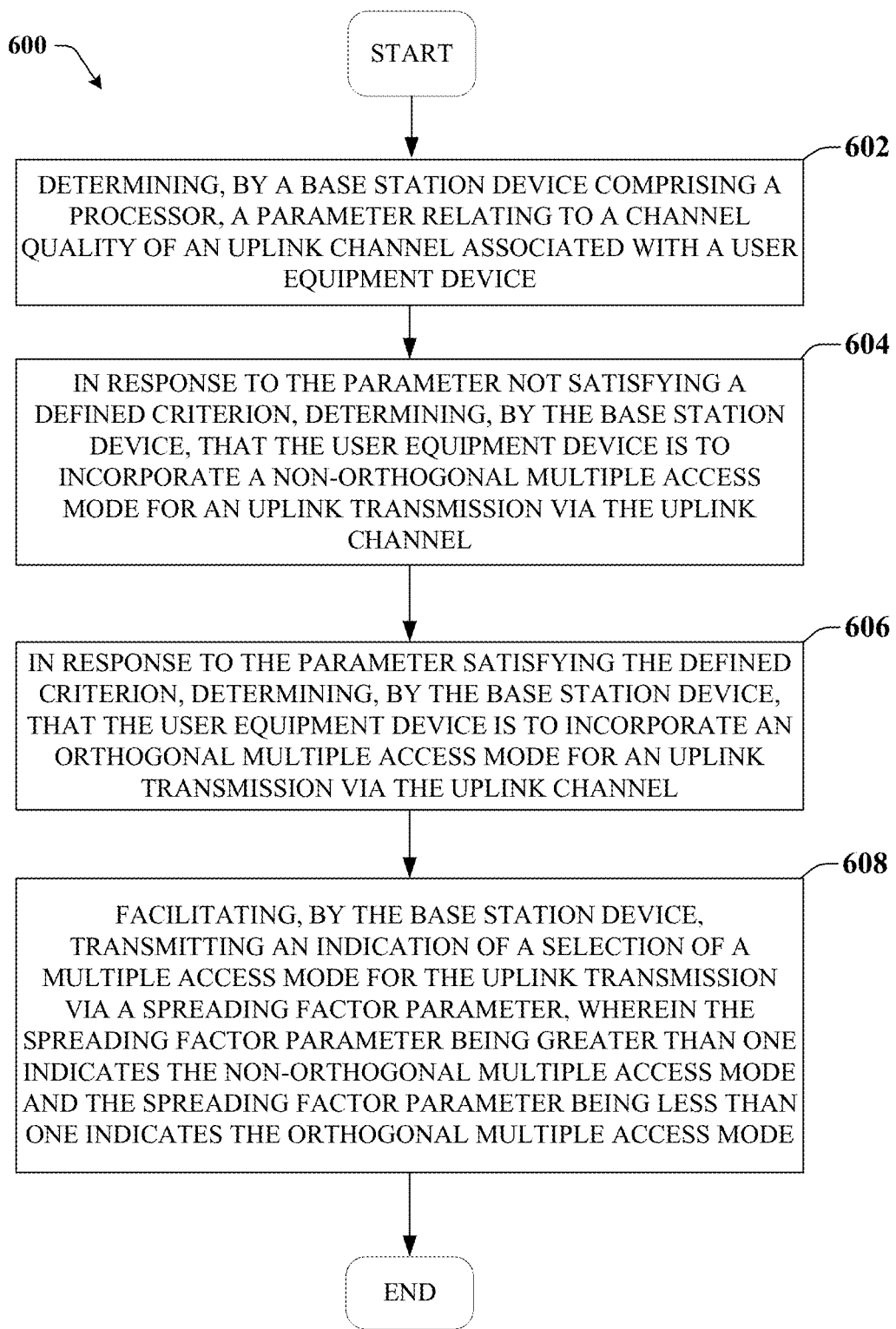
FIG. 6 illustrates an example method for switching between non-orthogonal and orthogonal multiple access systems in accordance with various aspects and embodiments of the subject disclosure.
Figure 7:
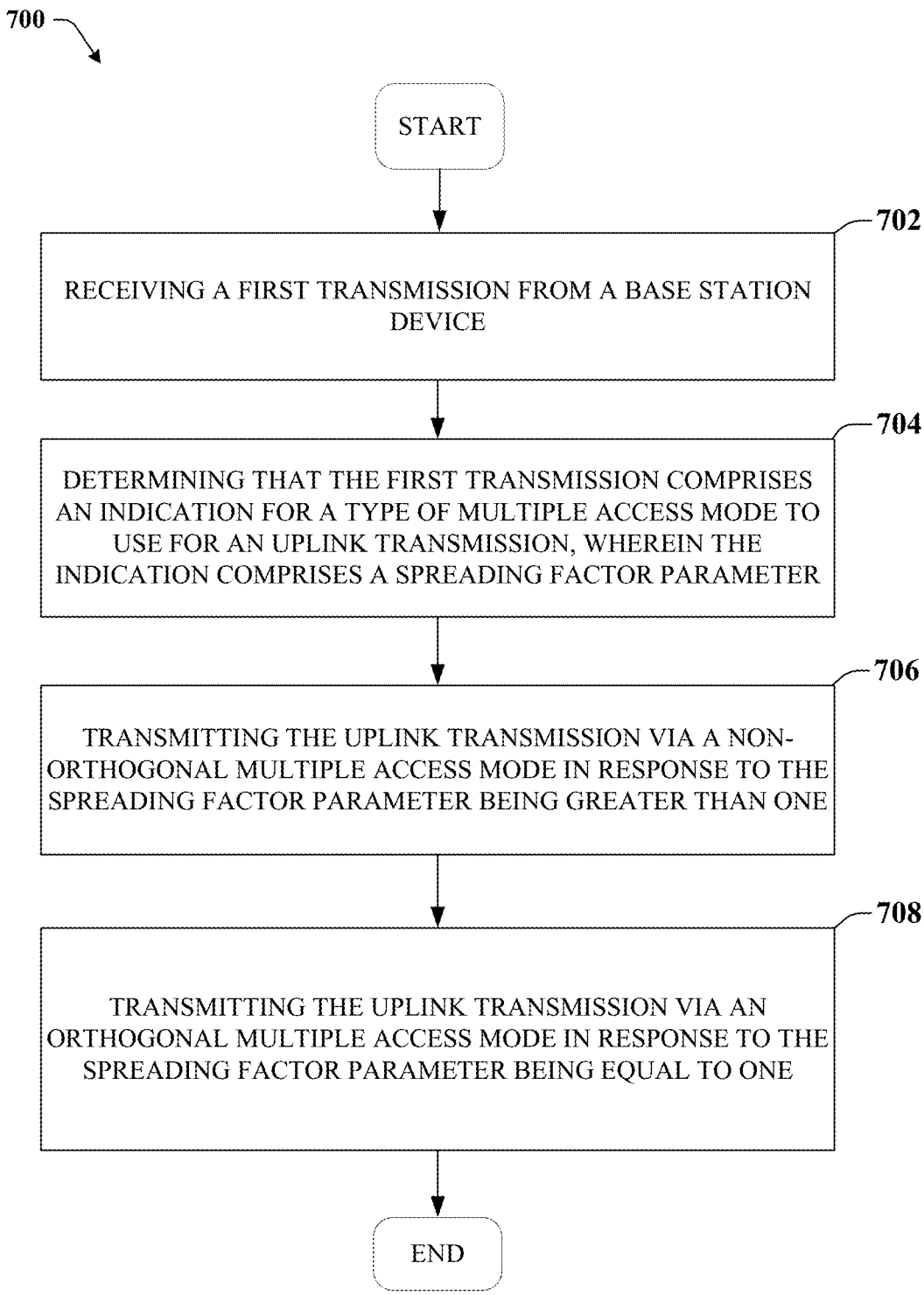
FIG. 7 illustrates an example method for switching between non-orthogonal and orthogonal multiple access systems in accordance with various aspects and embodiments of the subject disclosure.

FIGS. 6-7 illustrates a process in connection with the aforementioned systems. The processes in FIGS. 6-7 can be implemented for example by the systems in FIGS. 1-5 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 6 illustrates example method 600 for switching between non-orthogonal and orthogonal multiple access systems in accordance with various aspects and embodiments of the subject disclosure.

Method 600 can begin at 602 where the method includes determining, by a base station device comprising a processor, a parameter relating to a channel quality of an uplink channel associated with a user equipment device.

At 604, the method includes in response to the parameter not satisfying a defined criterion, determining, by the base station device, that the user equipment device is to incorporate a non-orthogonal multiple access mode for an uplink transmission via the uplink channel.

At 606, the method includes in response to the parameter satisfying the defined criterion, determining, by the base station device, that the user equipment device is to incorporate an orthogonal multiple access mode for an uplink transmission via the uplink channel.

At 608, the method includes facilitating, by the base station device, transmitting an indication of a selection of a multiple access mode for the uplink transmission via a spreading factor parameter, wherein the spreading factor parameter being greater than one indicates the non-orthogonal multiple access mode and the spreading factor parameter being less than one indicates the orthogonal multiple access mode.

FIG. 7 illustrates an example method 700 for switching between non-orthogonal and orthogonal multiple access systems in accordance with various aspects and embodiments of the subject disclosure.

Method 700 can begin at 702 wherein the method includes receiving a first transmission from a base station device.

At 704, the method can include determining that the first transmission comprises an indication for a type of multiple access mode to use for an uplink transmission, wherein the indication comprises a spreading factor parameter.

At 706, the method can include transmitting the uplink transmission via a non-orthogonal multiple access mode in response to the spreading factor parameter being greater than one.

At 708, the method can include transmitting the uplink transmission via an orthogonal multiple access mode in response to the spreading factor parameter being equal to one.

Figure 8:
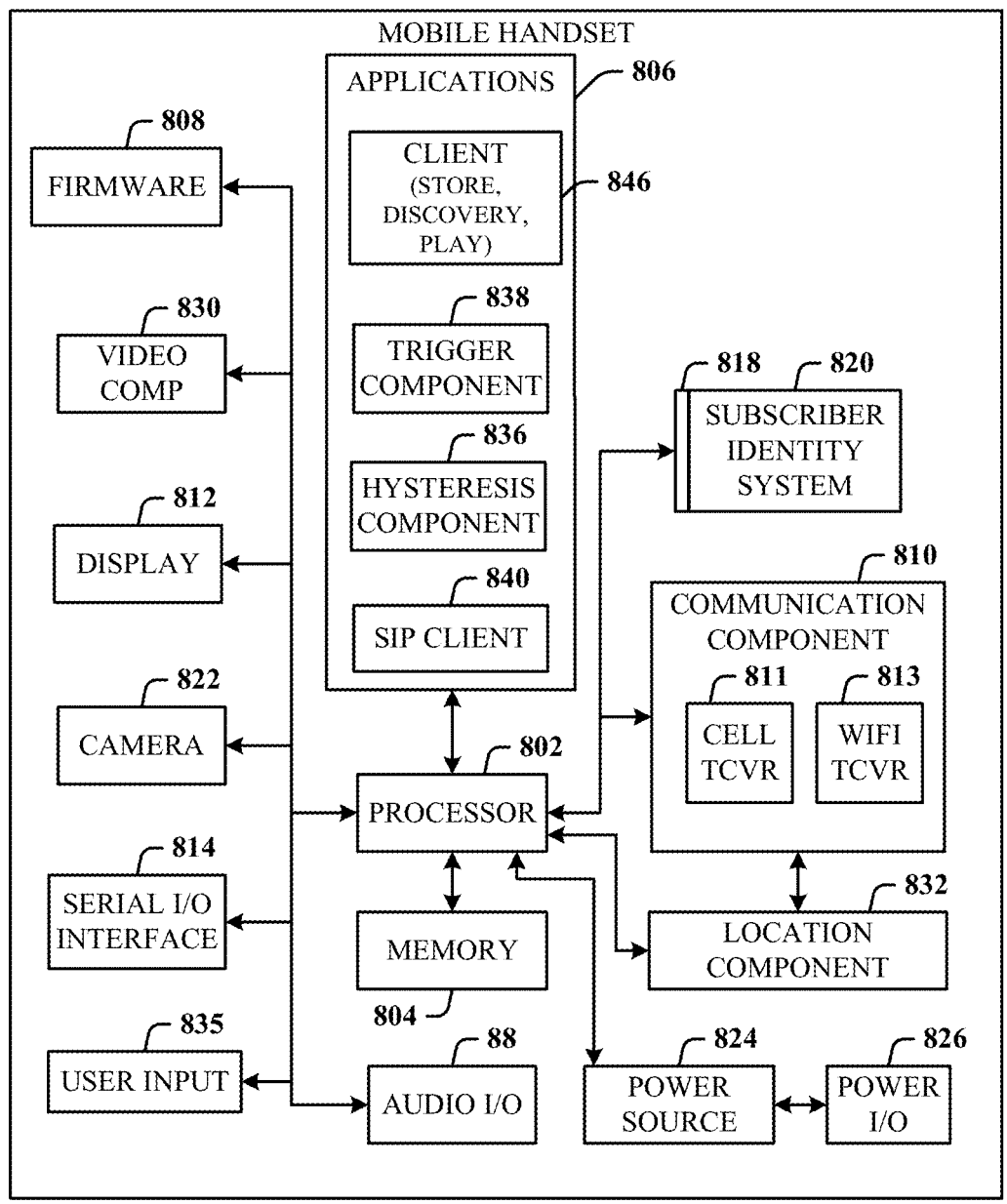
FIG. 8 illustrates an example block diagram of an example user equipment that can be a mobile handset in accordance with various aspects and embodiments of the subject disclosure.

Referring now to FIG. 8, illustrated is a schematic block diagram of an example end-user device such as a user equipment) that can be a mobile device 800 capable of connecting to a network in accordance with some embodiments described herein. Although a mobile handset 800 is illustrated herein, it will be understood that other devices can be a mobile device, and that the mobile handset 800 is merely illustrated to provide context for the embodiments of the various embodiments described herein. The following discussion is intended to provide a brief, general description of an example of a suitable environment 800 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The handset 800 includes a processor 802 for controlling and processing all onboard operations and functions. A memory 804 interfaces to the processor 802 for storage of data and one or more applications 806 (e.g., a video player software, user feedback component software, etc.). Other applications can include voice recognition of predetermined voice commands that facilitate initiation of the user feedback signals. The applications 806 can be stored in the memory 804 and/or in a firmware 808, and executed by the processor 802 from either or both the memory 804 or/and the firmware 808. The firmware 808 can also store startup code for execution in initializing the handset 800. A communications component 810 interfaces to the processor 802 to facilitate wired/wireless communication with external systems, e.g., cellular networks, VoIP networks, and so on. Here, the communications component 810 can also include a suitable cellular transceiver 811 (e.g., a GSM transceiver) and/or an unlicensed transceiver 813 (e.g., Wi-Fi, WiMax) for corresponding signal communications. The handset 800 can be a device such as a cellular telephone, a PDA with mobile communications capabilities, and messaging-centric devices. The communications component 810 also facilitates communications reception from terrestrial radio networks (e.g., broadcast), digital satellite radio networks, and Internet-based radio services networks.

The handset 800 includes a display 812 for displaying text, images, video, telephony functions (e.g., a Caller ID function), setup functions, and for user input. For example, the display 812 can also be referred to as a "screen" that can accommodate the presentation of multimedia content (e.g., music metadata, messages, wallpaper, graphics, etc.). The display 812 can also display videos and can facilitate the generation, editing and sharing of video quotes. A serial I/O interface 814 is provided in communication with the processor 802 to facilitate wired and/or wireless serial communications (e.g., USB, and/or IEEE 1394) through a hardwire connection, and other serial input devices (e.g., a keyboard, keypad, and mouse). This supports updating and troubleshooting the handset 800, for example. Audio capabilities are provided with an audio I/O component 816, which can include a speaker for the output of audio signals related to, for example, indication that the user pressed the proper key or key combination to initiate the user feedback signal. The audio I/O component 816 also facilitates the input of audio signals through a microphone to record data and/or telephony voice data, and for inputting voice signals for telephone conversations.

The handset 800 can include a slot interface 818 for accommodating a SIC (Subscriber Identity Component) in the form factor of a card Subscriber Identity Module (SIM) or universal SIM 820, and interfacing the SIM card 820 with the processor 802. However, it is to be appreciated that the SIM card 820 can be manufactured into the handset 800, and updated by downloading data and software.

The handset 800 can process IP data traffic through the communication component 810 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 822 (e.g., a camera) can be provided for decoding encoded multimedia content. The video processing component 822 can aid in facilitating the generation, editing and sharing of video quotes. The handset 800 also includes a power source 824 in the form of batteries and/or an AC power subsystem, which power source 824 can interface to an external power system or charging equipment (not shown) by a power I/O component 826.

The handset 800 can also include a video component 830 for processing video content received and, for recording and transmitting video content. For example, the video component 830 can facilitate the generation, editing and sharing of video quotes. A location tracking component 832 facilitates geographically locating the handset 800. As described hereinabove, this can occur when the user initiates the feedback signal automatically or manually. A user input component 834 facilitates the user initiating the quality feedback signal. The user input component 834 can also facilitate the generation, editing and sharing of video quotes. The user input component 834 can include such conventional input device technologies such as a keypad, keyboard, mouse, stylus pen, and/or touch screen, for example.

Referring again to the applications 806, a hysteresis component 836 facilitates the analysis and processing of hysteresis data, which is utilized to determine when to associate with the access point. A software trigger component 838 can be provided that facilitates triggering of the hysteresis component 838 when the Wi-Fi transceiver 813 detects the beacon of the access point. A SIP client 840 enables the handset 800 to support SIP protocols and register the subscriber with the SIP registrar server. The applications 806 can also include a client 842 that provides at least the capability of discovery, play and store of multimedia content, for example, music.

The handset 800 can include an indoor network radio transceiver 813 (e.g., Wi-Fi transceiver). This function supports the indoor radio link, such as IEEE 802.11, for the dual-mode GSM handset 1500. The handset 800 can accommodate at least satellite radio services through a handset that can combine wireless voice and digital radio chipsets into a single handheld device.

Figure 9:
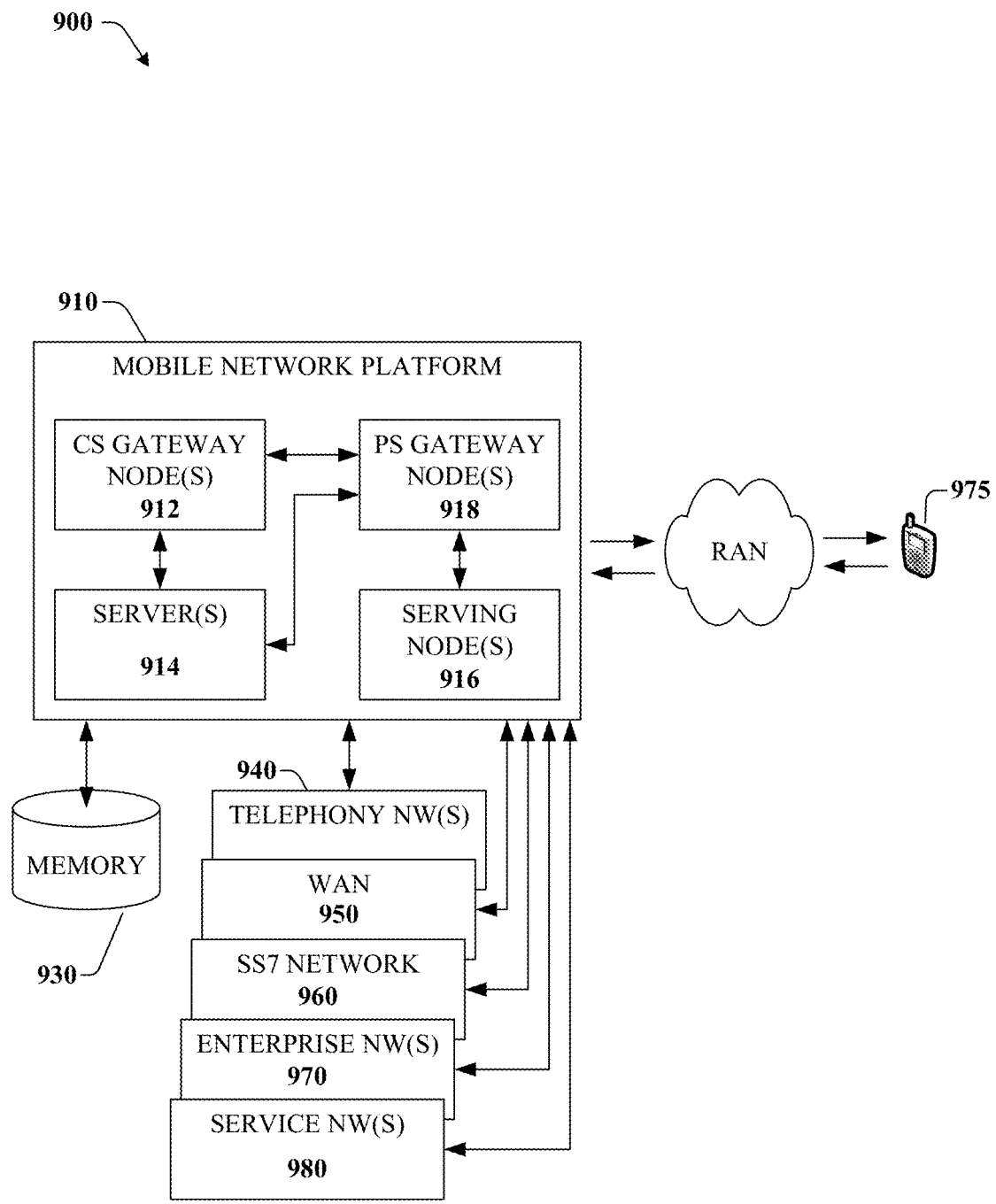
FIG. 9 illustrates an example block diagram of a non-limiting embodiment of a mobile network platform in accordance with various aspects described herein.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, and PGWs disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
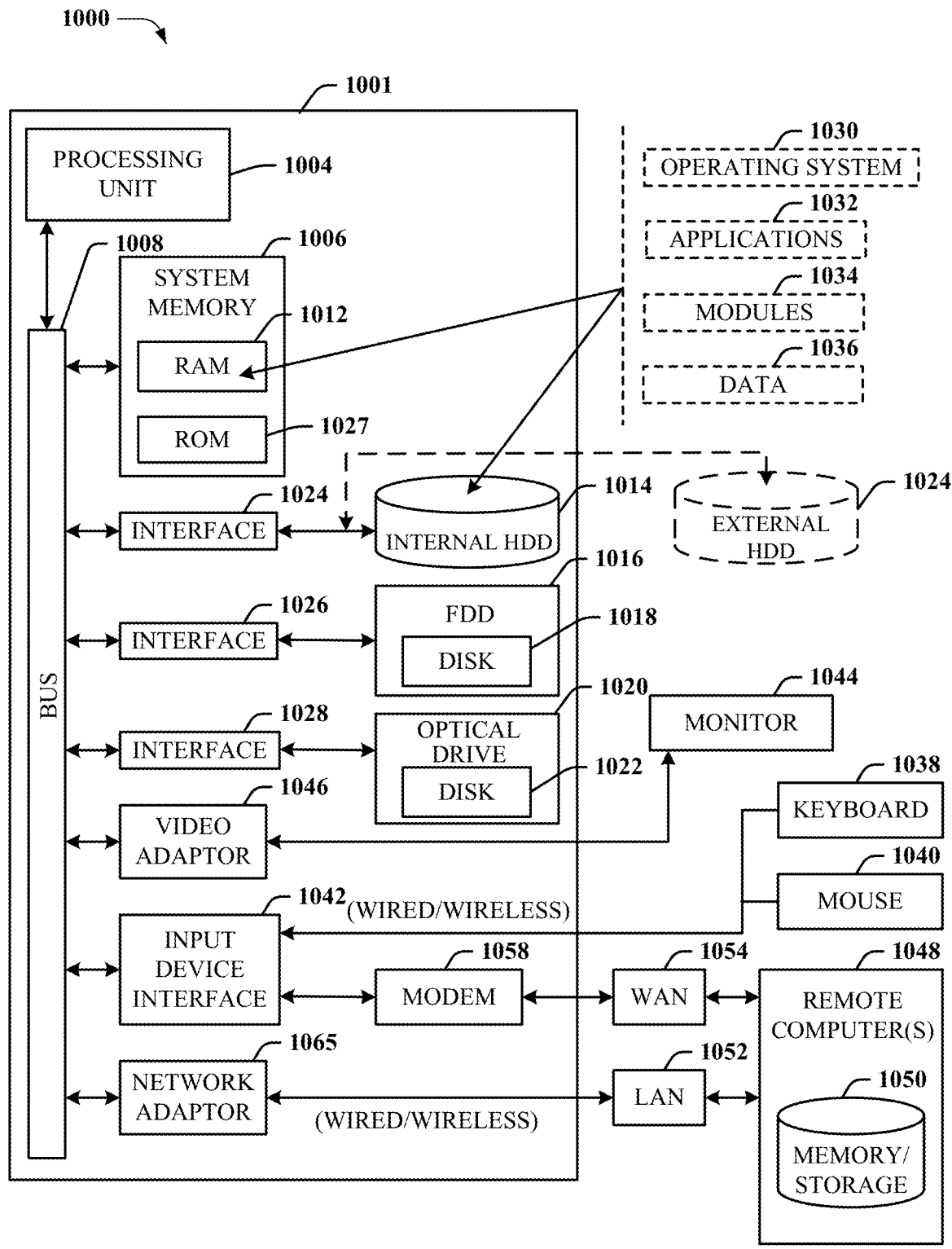
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 106, network node 206, e.g.,) or mobile edge computing device 108, 208, etc., may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring now to FIG. 10, there is illustrated a block diagram of a computer 1000 operable to execute the functions and operations performed in the described example embodiments. For example, a network node (e.g., network node 106, gNB 202, e.g.,) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
    determining, by network equipment comprising a processor, on a transmission time interval basis, a type of multiple access mode for use by a user equipment;
    facilitating, by the network equipment, a transmission, to the user equipment on the transmission time interval basis, an indication of a spreading factor parameter, wherein the spreading factor parameter is representative of a numerical value that indicates the type of multiple access mode for use by the user equipment; and
    based on an account preference defined for the user equipment, facilitating, by the network equipment, switching, on the transmission time interval basis, the type of multiple access mode.

2. The method of claim 1, wherein the type of multiple access mode is a non-orthogonal multiple access mode or an orthogonal multiple access mode.

3. The method of claim 1, wherein the determining comprises determining that the type of multiple access mode is a non-orthogonal multiple access mode, and wherein the method further comprises:
prior to the facilitating of the transmission, setting, by the network equipment, the numerical value to a value that indicates the type of multiple access mode is the non-orthogonal multiple access mode.

4. The method of claim 1, wherein the determining comprises determining that the type of multiple access mode is an orthogonal multiple access mode, and wherein the method further comprises:
prior to the facilitating of the transmission, setting, by the network equipment, the numerical value to a value that indicates the type of multiple access mode is the orthogonal multiple access mode.

5. The method of claim 1, wherein the determining comprises:
based on a path loss of a communication being above a defined path loss threshold, determining, by the network equipment, to use a non-orthogonal multiple access mode as the type of multiple access mode for use by the user equipment; and
based on the path loss of the communication being below the defined path loss threshold, determining, by the network equipment, to use an orthogonal multiple access mode as the type of multiple access mode for use by the user equipment.

6. The method of claim 1, wherein the switching further comprises:
based on a priority of a communication at the user equipment, switching, by the network equipment, on the transmission time interval basis, the type of multiple access mode.

7. The method of claim 1, wherein the switching further comprises:
based on a measured network load condition at the user equipment, switching, by the network equipment, on the transmission time interval basis, the type of multiple access mode.

8. The method of claim 1, wherein the facilitating of the transmission comprises facilitating the transmission of the indication of the spreading factor parameter during radio resource control signaling.

9. The method of claim 1, wherein the facilitating of the transmission comprises facilitating the transmission of the indication of the spreading factor parameter via downlink control channel signaling.

10. A system, comprising:
a processor; and
a memory that stores executable instructions that, when executed by the processor, facilitate performance of operations, comprising:
receiving, on a transmission time interval basis, an indication of a spreading factor parameter, wherein the spreading factor parameter is represented as a numerical value related to a type of multiple access mode for an uplink transmission;
sending, to network equipment, the uplink transmission using the type of multiple access mode determined based on the indication of the spreading factor parameter; and
based on a priority of a communication at a user equipment, switching, on the transmission time interval basis, the type of multiple access mode.

11. The system of claim 10, wherein the operations further comprise:

based on the numerical value failing to satisfy a defined value, sending the uplink transmission using a non-orthogonal multiple access mode.

12. The system of claim 10, wherein the operations further comprise:
based on the numerical value satisfying a defined value, sending the uplink transmission using an orthogonal multiple access mode.

13. The system of claim 10, wherein the operations further comprise:
based on an account preference defined for the user equipment, switching, on the transmission time interval basis, the type of multiple access mode.

14. The system of claim 10, wherein the operations further comprise:
based on a measured network load condition at the user equipment, switching, on the transmission time interval basis, the type of multiple access mode.

15. The system of claim 10, wherein the operations further comprise:
receiving the indication of the spreading factor parameter during radio resource control signaling.

16. The system of claim 10, wherein the operations further comprise:
receiving the indication of the spreading factor parameter via downlink control channel signaling.

17. The system of claim 10, wherein the operations further comprise:
based on a path loss of the communication being above a defined path loss threshold, prior to the sending, using a non-orthogonal multiple access mode as the type of multiple access mode for use by the user equipment; and
based on the path loss of the communication being below the defined path loss threshold, prior to the sending, using an orthogonal multiple access mode as the type of multiple access mode for use by the user equipment.

18. A non-transitory machine-readable medium, comprising executable instructions that, when executed by a processor, facilitate performance of operations, comprising:
determining a type of multiple access mode for use by a user equipment, wherein the determining is on a transmission time interval basis;
transmitting an indication of a spreading factor parameter, wherein the spreading factor parameter is a numerical value that indicates the type of multiple access mode for use by the user equipment, and wherein the transmitting is on the transmission time interval basis; and
changing the type of multiple access mode based on a communication priority or a preference defined for the user equipment, wherein the changing is performed on the transmission time interval basis.

19. The non-transitory machine-readable medium of claim 18, wherein the type of multiple access mode is one of a non-orthogonal multiple access mode or an orthogonal multiple access mode, and wherein the operations comprise:
based on the type of multiple access mode being determined to be the non-orthogonal multiple access mode, setting the numerical value to a first value that indicates the type of multiple access mode is the non-orthogonal multiple access mode; and
based on the type of multiple access mode being determined to be the orthogonal multiple access mode, setting the numerical value to a second value that indicates the type of multiple access mode is the orthogonal multiple access mode.

20. The non-transitory machine-readable medium of claim 18, wherein the determining comprises:
    based on a path loss of a communication being above a defined path loss threshold, using a non-orthogonal multiple access mode as the type of multiple access mode for use by the user equipment; and
    based on the path loss of the communication being below the defined path loss threshold, using an orthogonal multiple access mode as the type of multiple access mode for use by the user equipment.

* * * * *